United States Patent [19]
Ingham

[11] 4,181,569
[45] Jan. 1, 1980

[54] NUCLEAR REACTOR CONTROL

[75] Inventor: Robert V. Ingham, Knutsford, England

[73] Assignee: United Kingdom Atomic Energy Authority, London, England

[21] Appl. No.: 780,809

[22] Filed: Mar. 24, 1977

[30] Foreign Application Priority Data

Apr. 13, 1976 [GB] United Kingdom ............... 15136/76

[51] Int. Cl.$^2$ ................................................ G21C 7/08
[52] U.S. Cl. .................................. 176/36 R; 176/86 R
[58] Field of Search ..................... 176/24, 36, 38, 86 R

[56] References Cited

U.S. PATENT DOCUMENTS

| | | | |
|---|---|---|---|
| 2,803,761 | 8/1957 | Young | 176/36 R |
| 2,885,893 | 5/1959 | Lane et al. | 176/36 R |
| 2,927,070 | 3/1960 | Shong | 176/24 |
| 2,994,655 | 8/1961 | Taylor | 176/36 R |
| 3,124,513 | 3/1964 | Hawke et al. | 176/36 R |
| 3,162,796 | 12/1964 | Schreiber et al. | 176/36 R |
| 3,207,669 | 7/1965 | Fawcett et al. | 176/24 |
| 3,480,807 | 11/1969 | Downs et al. | 176/36 R |
| 3,486,095 | 12/1969 | Sherwood et al. | 176/36 R |
| 3,519,536 | 7/1970 | Rausch | 176/36 R |
| 3,625,816 | 12/1971 | Aleite et al. | 176/86 R |
| 3,734,825 | 5/1973 | Schabert et al. | 176/36 R |

FOREIGN PATENT DOCUMENTS

2459871 7/1975 Fed. Rep. of Germany ........ 176/36 R

OTHER PUBLICATIONS

Fast Reactor Technology; Plant Design, Yevick et al., M.I.T. Press (1966), pp. 584–589, 598.

Primary Examiner—Samuel W. Engle
Assistant Examiner—S. A. Cangialosi
Attorney, Agent, or Firm—Larson, Taylor and Hinds

[57] ABSTRACT

A liquid metal cooled fast breeder nuclear reactor has power setback means for use in an emergency. On initiation of a trip-signal a control rod is injected into the core in two stages, firstly, by free fall to effect an immediate power-set back to a safe level and, secondly, by controlled insertion. Total shut-down of the reactor under all emergencies is avoided.

4 Claims, 2 Drawing Figures

NUCLEAR REACTOR CONTROL

BACKGROUND OF THE INVENTION

This invention relates to the control of nuclear reactors.

In a nuclear reactor of the kind wherein fluid coolant is circulated through the reactor core and heat exchange means by a plurality of circulators there is a risk that in the event of a reduction in the rate of coolant flow, caused by, for example, loss of a coolant circulator, the nuclear fuel will overheat. It has been the normal practice therefore to arrange for a trip signal to be initiated in response to a significant reduction in the rate or pressure of the coolant flow whereby neutron absorbing material in the form of control rods is dropped or injected into the core to effect immediate and total shut-down of the reactor. Where the reactor is used in an electricity generating station this solution to the problem is not entirely satisfactory because it means a total loss of output, requires the introduction of auxiliary services for maintaining the reactor in a safe condition and, to recommence operation of the station, involves a complex start-up procedure. Clearly, immediate and total shut-down of a station imposes a heavy financial burden on the operators.

It is an object of the invention to provide for a nuclear reactor control means which will achieve a rapid reduction in power by change of reactivity of appropriate magnitude to meet the requirements for continued safe operation following a partial reduction in coolant flow or pressure.

SUMMARY OF THE INVENTION

According to the invention there is provided a nuclear reactor having a reactivity control system comprising at least one control rod of neutron absorbing material arranged for vertical displacement between a first operable position wherein the neutron absorbing material is disposed above the reactor core and a second operable position wherein the neutron absorbing material is disposed within the core, means for monitoring an operating parameter of the core, a first latching device for securing the control rod in the first operable position, the device being responsive to the monitoring means whereby on initiation of a trip signal the device can release the control rod, a second latching device for arresting fall of the control rod in the second operable position, and means for adjusting the second operable position relative to the reactor core, the means being responsive to reactivity within the reactor core.

Means for effecting insertion of the said control rod in two successive stages may comprise a first latching device for suspending the control rod above the reactor core the device being releasably sensitive to the trip signal, a second latching device for arresting free fall or uncontrolled injection of the control rod and means responsive to control signals for adjusting the position of the second latching device whereby the vertical position of arrest of the control rod and subsequent controlled insertion in the reactor core can be varied.

The invention is applicable to liquid metal cooled fast breeder nuclear reactors and it provides that in the event of an emergency condition wherein the rate of coolant flow is reduced, a rapid power set-back of appropriate magnitude is achieved by causing limited injection of control rods into the reactor, the insertion being sufficient to reduce reactivity to a safe level, and, subsequently, fine control at the reduced power output is achieved by automatic control.

DESCRIPTION OF THE DRAWINGS

A construction of liquid metal cooled fast breeder nuclear reactor embodying the invention is described, by way of example only, with reference to the accompanying drawings wherein.

DESCRIPTION OF THE PREFERRED EMBODIMENT

Figure 1:
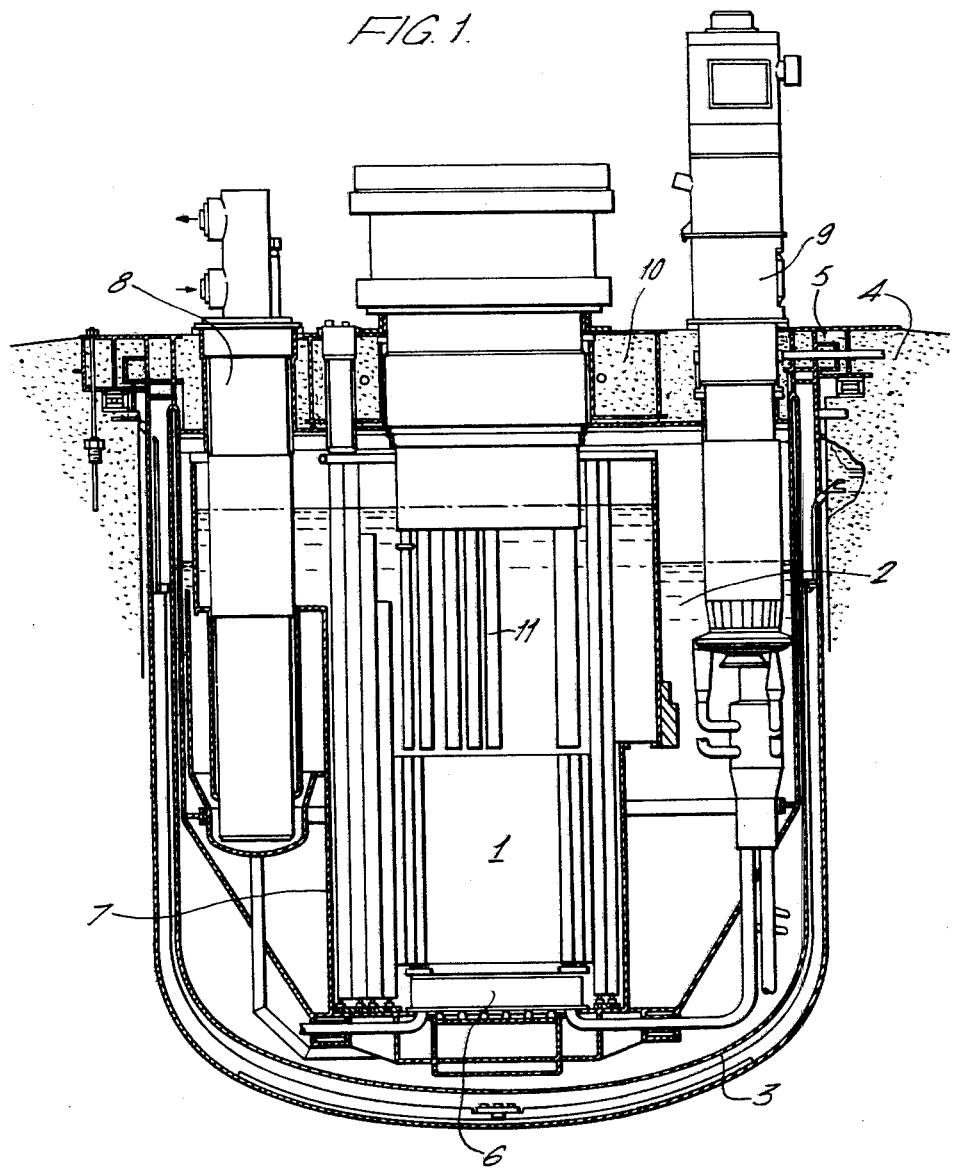
FIG. 1 is a sectional view of the construction.

In the nuclear reactor construction shown in FIG. 1 a fast breeder nuclear reactor core 1 is submerged in a pool 2 of liquid sodium contained within a primary vessel 3. The vessel 3 is housed in a concrete containment vault 4 having a cover 5 from which the primary vessel 3 depends. The reactor core is carried by a diagrid 6 which is supported from the cover 5 and the reactor core is housed within a shroud 7. The cover has numerous penetrations for ancillary equipment including four heat exchangers 8 and four coolant circulators 9 (only one each of heat exchanger and circulator being shown) and has a rotating shield 10. The rotating shield 10 comprises an outer rotatable member having an inner rotatable member mounted eccentrically in it, there being penetrations in the shield for control mechanisms 11 and to provide access to fuel assemblies in the core. In use, coolant at approximately 400° C. is circulated from the pool region outside of the shroud 7 through the core 1 where it is heated to approximately 600° C. by way of the diagrid and thence through the shroud 7 back to the pool region outside of the shroud by way of the heat exchangers 8. In the event of loss of one of the circulators thereby causing a large reduction in the rate of flow of coolant through the core it is necessary to reduce the power output of the reactor core immediately by the insertion of control rods thereby to avoid overheating.

Figure 2:
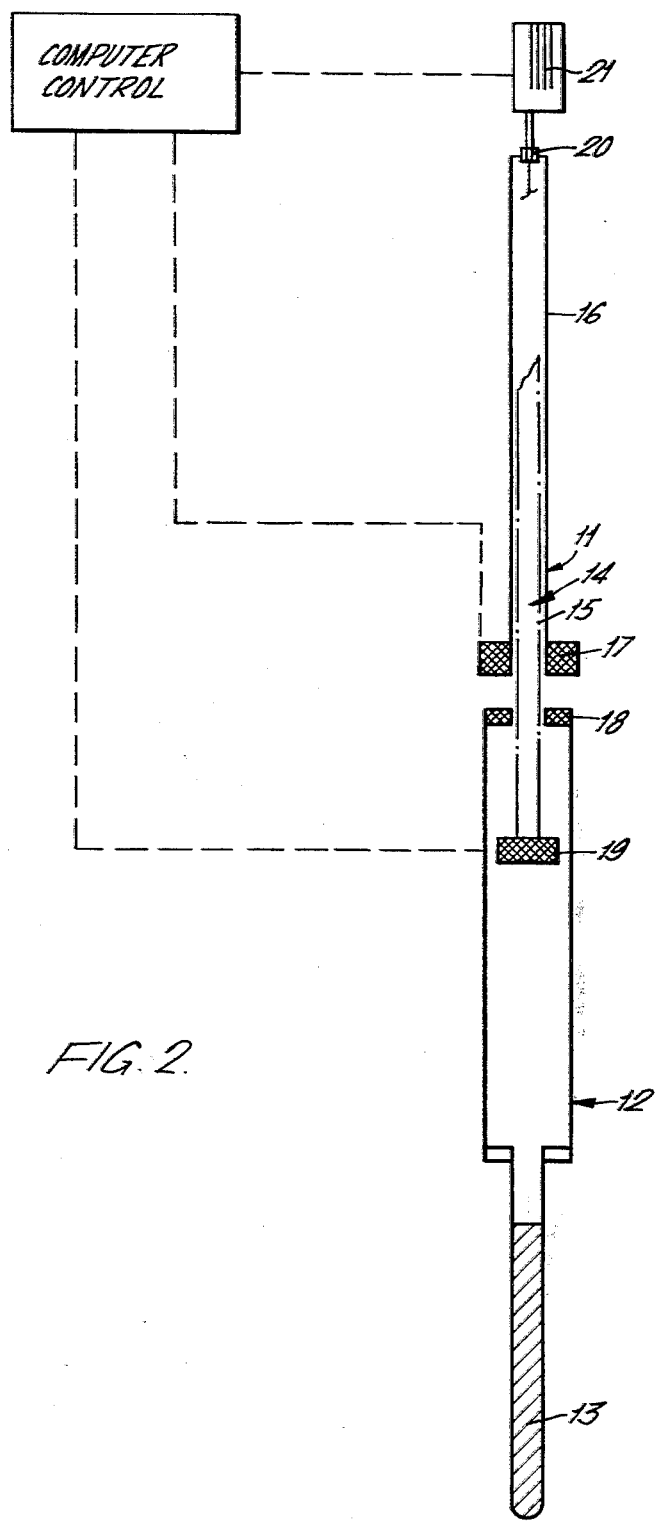
FIG. 2 is a diagrammatic sketch of a reactivity control mechanism.

The control mechanisms 11 are arranged in two groups, a first group being provided for normal automatic control of the reactor and a second group for emergency use in the event of a malfunction of the reactor and which could, where necessary, effect immediate shut-down of the reactor. The control mechanisms 11 of the second group each comprise a telescopic assembly as shown in FIG. 2. A lower section 12 of the assembly constitutes a control rod and comprises neutron absorbing material 13 such as boron steel and an upper section 14 comprises a screwed member 15. The upper section 14 is housed within a fixed tubular member 16 which has a first electromagnetic latching device 17 at its lower end. A complementary latching member 18 at the upper end of the lower section 12 of the assembly is arranged normally to be engaged with the latching device 17 to hold the neutron absorbing material above the reactor core. The lower end of the screwed member 15 has a second electromagnetic latching device 19 capable of arresting and engaging the latching member 18 when the lower section is released by the first latching device 17 and falls into the reactor core. The screwed member 15 engages a nut 20 rotatable by a drive motor 21 which is responsive to a control computor. The arrangement of the mechanism is such that the second latching device 19 is spaced from the first latching device 17 its displacement being controlled by computor signals which are a function of the initial power level.

In the event of a rapid reduction in the rate of coolant flow or pressure a trip signal is initiated to release the latch mechanism 17 of each assembly and to allow free fall of the control rods into the core to an extent determined by the position of the second latching devices which arrest the fall of the control rods. The partial insertion of the neutron absorbing material in the core affects an immediate reactivity change to cause a power set-back to a safe limit. The safe limit at any particular instance is assessed by the computor and the corresponding position of the second latching device is affected by the control computor. Thereafter the lower section 12 of each assembly supported by the second latching device, is variably inserted in the reactor core by means of the drive motor and screw mechanism under automatic control signals derived from the computer. When the adverse condition giving rise to the emergency has been cleared, for example, when the rate of coolant flow has been restored to its normal value, the drive motor is arranged to lift the lower section 12 in a safely controlled manner to re-engage the latching member 18 with the electromagnetic latching device whereby the neutron absorbing material is held out of the core.

The limited free fall of the control rod ensures a fast response to an emergency such as a sudden reduction in the rate of coolant flow and avoids the necessity of taking the reactor and associated power plant completely off-load for all emergencies.

Whilst the described construction provides for a single latching device 19 for arresting the free fall of the neutron absorbing material, a series of second latches could be used, each latching device being sensitive to a different reactor parameter so that in the event of an emergency an appropriate latching device can be arranged by means of a computer initiated signal to engage with the latching member 18 and arrest the fall of the control rod. The second latches may be arranged so that the lower control rod section 17 is arranged to slide freely over them unless energised in response to a control parameter.

Alternatively the control rods could be arranged to be propelled into the reactor core by means of stored energy (instead of relying on free fall) thereby to reduce the response time.

I claim

1. A nuclear reactor having a reactivity control system comprising: at least one control rod of neutron absorbing material arranged for vertical displacement between a first fixed operable position wherein the neutron absorbing material is disposed above the reactor core and a variable second operable position wherein the neutron absorbing material is disposed within the core, means for monitoring an operating parameter of the core and initiating a trip signal in response to a predetermined condition, a fixed first latching device for securing the control rod in the first operable position, the device being responsive to the monitoring means whereby on initiation of a trip signal the device can release the control rod, a second latching device for variably arresting fall of the control rod in the variable second operable position, and means for adjusting the variable second operable position relative to the reactor core while said rod is held by either of said first and second latching devices, the adjusting means being responsive to reactivity within the reactor core, whereby the initial position of arrest of a released rod and subsequent controlled insertion in the reactor core can be varied.

2. A nuclear reactor according to claim 1, wherein the means for adjusting the second operable position of the control rod is optionally capable of operation by alternative control means whereby the control rod can be returned to the first operable position.

3. A nuclear reactor according to claim 2 wherein the latching devices are of the electro-magnetic kind releasable by interruption of the power supply to the latching devices.

4. A nuclear reactor according to claim 3 having a plurality of second latching devices arranged in series, each second latching device being responsive to a discrete reactor parameter.

* * * * *